Dec. 8, 1964 R. T. STEINER ETAL 3,160,318
VARIABLE QUANTITY CREAM DISPENSER
Filed April 6, 1961
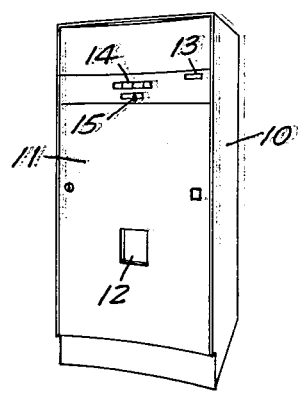
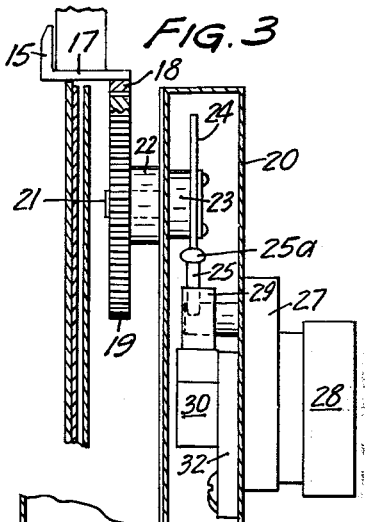
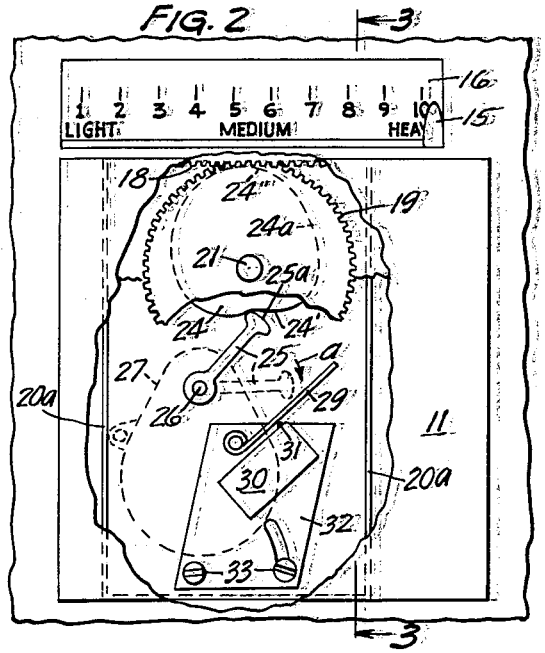
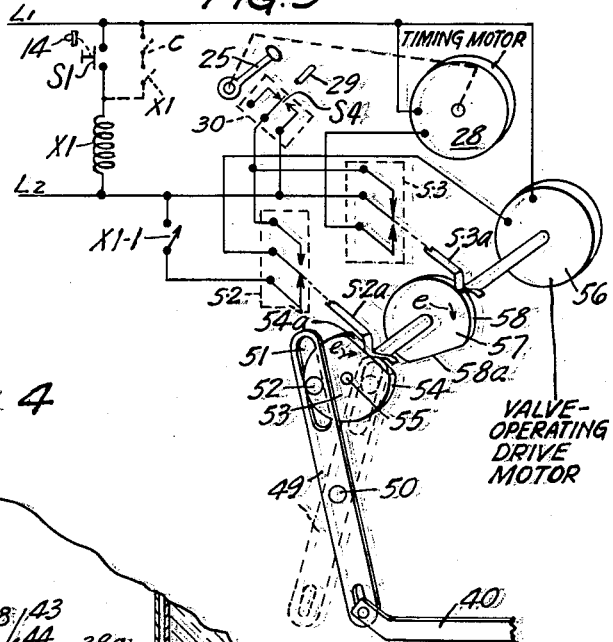
INVENTOR
ROBERT T. STEINER
GEORGE E. WOODIS
BY Williamson & Palmatier
ATTORNEYS

United States Patent Office 3,160,318
Patented Dec. 8, 1964

3,160,318
VARIABLE QUANTITY CREAM DISPENSER
Robert T. Steiner and George E. Woodis, Minneapolis, Minn., assignors to Northwest Automatic Products Corporation, Minneapolis, Minn., a corporation of Minnesota
Filed Apr. 6, 1961, Ser. No. 112,143
5 Claims. (Cl. 222—43)

This invention relates to coffee dispensing equipment for serving coffee with the desired ingredients such as cream, and more particularly relates to the cream dispenser for dispensing an amount of cream which is desired by the purchaser of the cup of coffee.

In the past, dispensing machines have been known wherein the amount of cream put into the cup of coffee may be either light or heavy but there has been no means by which the person purchasing the cup of coffee could control, with any degree of accuracy, the amount of cream put into the cup.

An object of my invention is to provide a new and improved cream-dispensing apparatus of simple and inexpensive construction and operation for use in a coffee-dispensing machine so that the quantity of cream may be carefully controlled.

Another object of my invention is the provision of a novel cream-dispensing apparatus which may be manually operated by the purchaser of a cup of coffee so that the quantity of cream applied into the cup of coffee may be the desired amount and may be carefully regulated.

These and other objects and advantages of my invention will more fully appear in connection with the following description made in connection with the accompanying drawings wherein like reference characters refer to the same parts throughout the several views and in which:

FIG. 1 is a perspective view of the coffee-dispensing machine;

FIG. 2 is a detail elevation view of a portion of the control apparatus for the cream-dispensing unit;

FIG. 3 is a detail section view taken approximately at 3—3 in FIG. 2;

FIG. 4 is a section view, partly broken away, of the cream-dispensing valve and operating apparatus therefor;

FIG. 5 is a diagrammatic electro-mechanical schematic view of the electrical circuitry and mechanical components which control certain elements in the circuitry.

One form of the present invention is shown in the drawings and is described herein.

The coffee-dispensing machine is indicated in general by numeral 10 and includes a front panel 11 having a small compartment 12 therein with the front thereof open into which a paper cup wil fall and be filled with coffee and have a proper quantity of cream dispensed in the cup, according to the desires of the purchaser. The coin slot 13 is on the front panel 11, as is the push button 14 which starts the cycle of operation after the proper coin has been deposited.

As seen in FIGS. 2 and 3, a manually operated pointer 15 projects forwardly of the front door panel 11 and lies substantially along an illuminated panel 16 which has a scale thereon so that each time a particular person operates the machine 10, the pointer 15 may be located at precisely the same or desired position. The position of the pointer 15 along the scale on the panel 16 determines the quantity of cream which will be dispensed into his coffee cup. The pointer 15 is mounted on a rearwardly extending bar 17 which is affixed to a rack or linear gear 18 which is suitably slidably mounted immediately behind the front door panel and has the gear teeth thereof meshed with a rotary gear 19 journalled on a sub-frame 20, the side portions 20a of which are affixed as by spot welding to the door panel 11. The mounting shaft 21 for gear 19 is carried in a suitable bearing 22 and the shaft 21 is also affixed to a mounting 23 for a rotary cam 24 so that by sliding the pointer 15 from one end of the scale to the other end, the cam 24 will be oriented in various corresponding rotary positions. It will be noted that the camming surface 24a on the periphery of the cam 24 varies in its distance from the center of rotation of the cam 24 so that at 24' the camming surface is rather closely spaced with respect to the rotation axis, and at 24", the camming surface is substantially further removed from the rotation axis, and the cam surface 24a progressively varies in its spacing from the rotation axis between 24' and 24".

A timing arm 25 has a head thereon 25a which normally engages the cam surface 24a of the cam 24 and the arm 25 is mounted on the output shaft 26 of the speed-reducing gear mechanism 27 which is mechanically connected in driven relation to the constant speed motor 28. The motor 28 and gear mechanism 27 is of substantially standard design and includes a clutch arrangement and also includes a return spring so that the shaft 26 and arm 25 is normally resiliently urged to the full line position shown in FIG. 2 after the power to the motor 28 has been cut off. When the motor 28 is operated, the arm 25 swings at a constant speed in the direction of arrow $a$ and after a short period of time, depending upon the starting point of the arm 25, the arm 25 will engage the operating lever 29 of a switch 30, so that the lever 29 engages the switch-operating button 31 so as to operate the switch. The switch 30 is mounted on a frame plate 32 which is adjustably secured by screws 33 to the portion of the sub-frame 20. The functions of the timing motor 28 and the swinging arm 25 are more fully pointed out hereinafter, but at this point of the disclosure it is sufficient to say the time during which the cream-dispensing valve is open is determined by the length of time necessary for the arm 25 to travel from the cam 24a into engagement with the switch-operating lever 29.

As best seen in FIG. 4, a quantity of cream C is contained in a can or container 35, which is confined within a refrigerated jacket 36. The cream-dispensing valve mechanism, indicated in general by numeral 37, is mounted in the bottom portion of the can 35 and the outer tubular or cylindrical jacket 38 of the valve mechanism is actually welded in an aperture in the bottom of the can 35 so that an inner end portion 38a of the tube 38 lies on the bottom of the can, and the outer end portion 38b extends outwardly from the can 35, through the refrigerated jacket 36 and to the exterior. The refrigerated jacket 36 of can 35 will be mounted on the back side of the door panel 11 in such a position that the cream will be dispensed downwardly through the area 39 immediately beneath the outer end portion 38b of the valve tube 38. The valve apparatus 37 includes a valve-operating stem 40 projecting through the tube 38 and having a pair of operating pistons 41 and 42 affixed thereon for moving along the inner surface of the tube 38 and defining therebetween a cream-measuring chamber 43 which actually moves along the barrel or tube 38 as the valve stem 40 and pistons 41 and 42 are moved forth and back in the tube 38.

A pair of apertures 44 in the inner end portion of the tube 38 provides the inlet for the cream measuring chamber 43 arranged in the lower and upper sides of the tube 38 so that the chamber will completely fill when the piston 41 is moved inwardly beyond the apertures 44. An elongate slot 45 is provided in the lower side of the outer end portion 38b of tube 38 to provide the outlet for the cream-measuring chamber 43 when the valve and pistons are pulled outwardly. An additional slot 45a is disposed in diametrically opposed relation with the slot 45 and the slots 45 and 45a slidably receive a pair of lugs 46 which sweep back and forth along the slots so as to clear any obstructions, such as skimmed-over cream or the like, from the slots so that dispensing of the cream from the chamber 43 will commence immediately when the valve stem 40 is pulled outwardly in the direction of arrow c. It will be noted that the piston 42 has a cylindrical rear end 42a with an aperture 42b which aligns with the slot 45 when the piston 42 is moved outwardly. The size of the aperture 42b is carefully controlled so that the cream will drain from the measuring chamber 43 at a predetermined rate.

An additional aperture 42c is provided in diametrically opposed relation with the discharge aperture 42b so as to provide an entrance for air into the chamber 43 as the cream is being dispensed at the bottom.

The lugs 46 are slidably mounted on the valve stem 40 and when the valve stem 40 moves outwardly, the lugs 46 will be urged by the piston 42 along the slots 45 and 45a. A spring 47 bears against the lugs 46 and against the removable cover 48 threaded on the tube 38 so as to urge the lugs toward the inner ends of the slots 45 and 45a when the valve stem 40 is moved inwardly. It will be noted that the longitudinal spacing between the inner end of slots 45 and 45a and the inlet aperture 44 is in excess of the spacing between the pistons 41 and 42 so that as the valve stem 40 is pulled outwardly, the inlet to the measuring chamber 43 is closed and then the cream in the measuring chamber is temporarily trapped and subsequently, as the valve stem 40 continues to move outwardly, the outlet from the chamber 43 is open so that the cream may be discharged. It will be apparent that a period of time is necessary for draining all of the cream from the measuring chamber 43 through the aperture 42b, and it will be noted that the proportion of the cream dispensed from the chamber 43 will be in direct relation to the time during which the outlet of the chamber 43 is opened. In certain instances, the outlet from the chamber 43 is open only instantaneously and in other cases the outlet will be opened sufficiently long to allow all of the cream in the chamber to be discharged.

Means are provided for producing outward and inward reciprocation of the valve stem 40 in response to the receipt of a coin in the coin slot 13 and the operating of the start button 14. In the form shown, the valve stem 40 is pivotally connected to a swingable operating link 49 which is mounted by means of a pivot 50. The upper end of the link 49 is slotted at 51 and a drive element 52 is fitted into the slot and is affixed to a rotary drive member 53 which has a circumferential or peripheral camming surface 54 which is substantially cylindrical, but which has a flat portion 54a thereon. The drive member or cam 53 is affixed as by keying to a drive shaft 55 of a valve-operating drive, slow speed drive motor 56. A second cam 57 is also affixed on the shaft 55 in side-by-side relation with the cam 53 and the cam 57 also has a cylindrical camming surface 58 which has a flat portion 58a thereon. A pair of circuit operating switches S2 and S3 are mounted adjacent the cams 53 and 57 respectively and the engaging ends of the switch-operating levers S2a and S3a are disposed for engagement with the camming surfaces 54 and 58 respectively.

It will be noted that the flat portions 54a and 58a are disposed at oblique positions with respect to each other so that as the cams 53 and 57 are revolved in the direction of arrows e, the switches S2 and S3 will be operated sequentially. The detail operation of the circuit shown in FIG. 5 is explained in detail hereinafter, but it is sufficient to say at this point of the disclosure that after the coin is inserted and the push button 14 is operated, the drive motor 56 is started so as to pull the valve stem 40 outwardly and when the valve stem has been pulled outwardly to cream-dispensing position, the flat portion 58a of cam surface 58 will allow movement of switch-operating lever S3a to operate the switch S3, at which time the timing motor 28 starts and after the valve has been open for a predetermined period of time, the drive motor 56 is started again and the timing motor 28 is stopped so that the valve stem 40 is moved inwardly to the normal position as shown.

In FIG. 5 it will be noted that the switch S2 is shown in its normal position because the operating lever thereof is on the flat of cam 54; and it will further be noted that switch S3 is shown in its operated condition because the operating lever S3a thereof is engaging the round surface of cam surface 58, but the switch S3 will return to normal position when the operating lever thereof engages the flat 58a. Line voltage is supplied through the buses L1 and L2. One side of the timing motor 28 is connected directly to bus L1 and the other side of the timing motor 28 is connectible to bus L2 through switch S3 in its normal position. One side of valve-operating drive motor 56 is connected directly to bus L1 and the other side thereof is connectible to bus L2 through switch S2 in its normal position and through contact X1–1 of relay X1 when the relay contact is closed; and said other side of drive motor 56 is also connectible to bus L2 through switch S2 when operated, and through either of switches 30 when operated or S3 when in operated position.

The coil of relay X1 is connected directly at one side of bus L2 and is connectible at the other side of bus L1 through the manually operated push button switch S1. In the circuit shown, no holding contact is essential for operating the cream dispenser; but a holding circuit may be provided in shunt with respect to switch S1 as shown in dotted lines in FIG. 5. The holding circuit would include one of the contacts of relay X1 and would include another contact or switch C for breaking the holding circuit soon after the cream dispenser is set into operation.

*Operation*

In the use and operation of the present invention, a person desiring a cup of coffee will insert his coin into the slot 13 and will adjust the pointer 15 along the scale on panel 16 so as to set the amount of cream that he desires in his cup of coffee. The movement of the pointer 15 along the scale will move the rack 18 and rotate the gear 19 so as to rotate the cam 24 and position the end of arm 25 so as to determine the amount of movement of the arm 25 necessary to operate switch 30 (which is the same as switch S4 in the circuit diagram).

When the push button 14 is operated, the switch S1 is closed so as to operate relay X1 to close the contact X1–1 thereof. The push button switch 14 must necessarily be held at least momentarily unless a holding circuit is provided as seen in dotted lines in FIG. 5. When contact X1–1 is closed, the drive motor 56 receives power through switch S2 in its normal position. As soon as drive motor 56 starts, the valve stem 40 starts its outward movement by operation of the drive element 52 against the link 49 and as the cam 53 revolves, the operating lever of switch S2 shifts the contacts of S2 so that drive motor 56 now receives its power through switch S2 in operated condition and switch S3, also in operated position. The push button 14 may now be released so that the relay will be de-energized and the contacts thereof may reopen. As the valve stem 40 is withdrawn, the outlet slot 45 is subsequently opened to the aperture 42b so that cream will start to drain from the measuring chamber 43. Then, substantially simultaneously with the opening of the outlet from the measuring chamber 43, the flat 58a of cam surface 58 will move under the operating lever of switch S3 so as to allow switch S3 to return to normal position.

When the switch S3 returns to normal position, the drive motor 56 is de-energized and stops, and substantially simultaneously, the timing motor 28 is connected to bus L2 through switch S3 in its normal position. As a result, the arm 25 will commence swinging at a predetermined rate and in the direction of arrow a from the previously set starting position thereof which is controlled by the orientation of cam 24. After a predetermined length of time which is controlled by the spacing between the peripheral cam surface 24a and the operating lever 29 of the switch 30 the switch 30 is operated so as to close the contacts thereof, whereupon the drive motor 56 is again started so as to again move the valve stem 40 and rotate the cams 53 and 57. Because of the position of the driving element 52, the valve stem 40 is quickly moved inwardly so as to close the outlet of the measuring chamber 43 in the desired time so that only the desired quantity of cream will be dispensed into the person's cup of coffee.

As the cam 57 is again revolved, the operating lever S3a of switch S3 will move off the flat 58a so as to deenergize timer motor 28 and cause the same to stop. As soon as the timer motor stops, the spring-operated clutch mechanism thereof will return the timer arm 25 back against the cam surface 24a so as to allow switch 30 to return to normal position. Drive motor 56 will continue to be powered through the switch S2 in operated condition and switch S3 in operated condition, until cam 53 is revolved sufficiently so that the flat 54a moves under the operating lever S2a to permit switch S2 to return to normal position, whereupon the circuit between drive motor 56 and bus L2 is opened and drive motor 56 is thereby stopped.

It should be particularly pointed out that when the pointer 15 is at the position shown, a maximum of time is required for the timer arm 25 to swing from its initial position in engagement with the camming surface 24, over to the switch-operating arm 29, and during this period of time, all of the cream from the measuring chamber 43 will be dispensed into the person's coffee cup so that a very substantial amount of cream will be mixed with the coffee. On the other hand, if the pointer 15 is moved to the left as seen in FIG. 2 at about the numeral 1, the cam 24 will be revolved so as to locate the timer arm 25 at its starting position in very closely spaced relation with the switch-operating lever 29 so that only a minimum amount of time is required for the timer motor 28 to move the arm 25 into engagement with the switch-operating lever 29 for operating switch 30. By adjusting the pointer 15 at intermediate positions, the length of time during which the cream-dispensing valve 37 is open, may be accurately varied with a high degree of accuracy. It will further be noted that the amount of cream which is dispensed during any period of time will be constant regardless of whether the can 35 is substantially full or substantially empty and therefore regardless of whether a substantial head or only a minimum head of fluid pressure is applied on the cream at the valve 37. This independence of the head on the cream is caused by the trapping of the cream in the measuring chamber 43 after the cream inlets 44 have been closed and prior to the opening of the outlet slot 45. When the outlet 45 is opened, the head or pressure on the cream at the outlet opening is always the same because the measuring chamber 43 will be full, but will be isolated from the pressure existing in the can 35. Furthermore, it should be noted that the timing of the opening of the valve carefully controls the quantity of cream dispensed because the cream always starts to flow at the outlet 45 at the proper instant because the lugs 46 sweep the outlet slot free of any obstructions such as skimmed over cream or the like. It should be particularly noted that the lug 46 extends beyond the lower edge or end of the slot 45 so that there will be no obstruction in any portion of the slot 45 which would tend to slow or preclude the flow of cream therefrom. The stream of cream discharged from the slot 45 and aperture 42b will be continuously spaced from the area 39 and will not engage the sidewalls thereof, so that there is no possibility of skinning over at any position adjacent the discharge area of the valve 37.

It will be understood that the coffee machine 10 includes a coffee-dispensing unit of substantially conventional design and a coffee-dispensing unit for dropping a cup into the filling compartment, after which the coffee is dispensed into the coffee cup substantially simultaneously with the cream, all in response to the operation of the push button 14.

It will, of course, be understood that various changes may be made in the form, detail, arrangement and proportion of the parts without departing from the scope of my invention which consists of the matter described herein and set forth in the appended claims.

What is claimed is:

1. Apparatus for dispensing a desired quantity of cream which is supplied from a source having a variable pressure head, comprising a frame, operable means measuring and confining a predetermined quantity of cream within a chamber and having a filling inlet adapted for connection in flow communication with the source and also a discharging outlet, said operable means including an operating member movable on the frame between first and second positions, said operable means also including valve element means connected with said operating member and causing sequential closing and opening of the inlet and outlet respectively as the member is moved from the first to the second position and also causing sequential closing and opening of the outlet and inlet as the operating member is moved from second position to first position, an electric motor on the frame connected with the operating member and moving the same to and between said first and second positions, circuit means connected with said motor and causing separate and successive first and second operations of the motor to move the operating member from said first position to the second position, and from the second position to the first position respectively, and said circuit means including a switch on the frame to actuate said second operation of the motor when the switch is operated and to thereby cause closing of the outlet, an adjustable stop movably mounted on the frame and spaced from the switch and being adjustable to vary the spacing therefrom to the switch, means connected with the stop for adjusting the same, a movable switch-operating element on the frame and disposed between the stop and switch for sequential engagement therewith, drive means connected with and moving the switch-operating element at a constant speed from the stop and toward the switch to operate the switch and cause closing of the outlet after a predetermined period depending upon the spacing between the stop and the switch, said circuit means also actuating said driving means at the end of the first operation of the motor, and said circuit means and switch also stopping said driving means when the motor is actuated for its second operation, said driving means also returning the switch-operating element against the stop.

2. The invention set forth in claim 1 wherein said stop comprises a rotary cam having a peripheral cam surface with the various portions thereof spaced varying distances from the cam rotation axis and said peripheral cam surface being engageable by the switch-operating element, and said means for adjusting the stop including manually operated cam-rotating apparatus.

3. The invention set forth in claim 1 wherein said stop comprises a rotary cam having a peripheral camming surface with various portions thereof spaced at varying distances from the cam rotation axis, the peripheral cam surface engaging said switch-operating element, a rotary gear affixed to the rotary cam and rotating therewith, and a slidable rack having a manually controllable indicator element thereon, the rack being meshed with the gear for rotating the cam, and means defining a scale adjacent said rack-operating element to facilitate proper positioning thereof.

4. Apparatus for dispensing a desired quantity of liquid which is supplied from a source having a variable pressure head, comprising a frame, a liquid delivery conduit means on the frame and including a discharge port, a valve element means controlling liquid discharged through the port, a liquid supplying means adapted for connection with the source of liquid in liquid flow communicating relation and supplying a measured quantity of liquid into the conduit means to the valve element means, actuating means operating said valve element means to open and close the port, circuit means controlling said actuating means, and said circuit means including a switch on the frame and having first and second operable positions respectively retaining said port in open condition and producing operation of said actuating means to close the port, an adjustable stop movably mounted on the frame and spaced from the switch and being adjustable to vary the spacing therefrom to the switch, means connected with the stop for adjusting the same, a movable switch-operating element on the frame and disposed between the stop and switch for sequential engagement therewith, drive means connected with and moving the switch-operating element at a constant speed from the stop and toward the switch to operate the switch and effect operation of said actuating means and closing of the port after a predetermined period depending upon the spacing between the stop and the switch, and means responsive to movement of said valve element means into port-opening position and commencing operation of said drive means to move the switch operating element toward the switch, and said circuit means also stopping said driving means when the switch is operated to effect closing of the port, said driving means also returning the switch operating element against the stop.

5. The liquid dispensing apparatus of claim 4 wherein said switch is also adjustable toward and away from said stop whereby to facilitate adjusting the maximum liquid to be dispensed.

References Cited in the file of this patent

UNITED STATES PATENTS

| | | |
|---|---|---|
| Re. 23,830 | Mojonnier | May 18, 1954 |
| 2,029,460 | Brady | Feb. 4, 1936 |
| 2,433,054 | Lime | Dec. 23, 1947 |
| 2,884,165 | Moeller | Apr. 28, 1959 |
| 2,907,495 | Brous | Oct. 6, 1959 |
| 3,002,659 | Woodis | Oct. 3, 1961 |